Dec. 23, 1958        R. E. GILBERT        2,865,100
DEBURRING TOOL
Filed Feb. 8, 1956
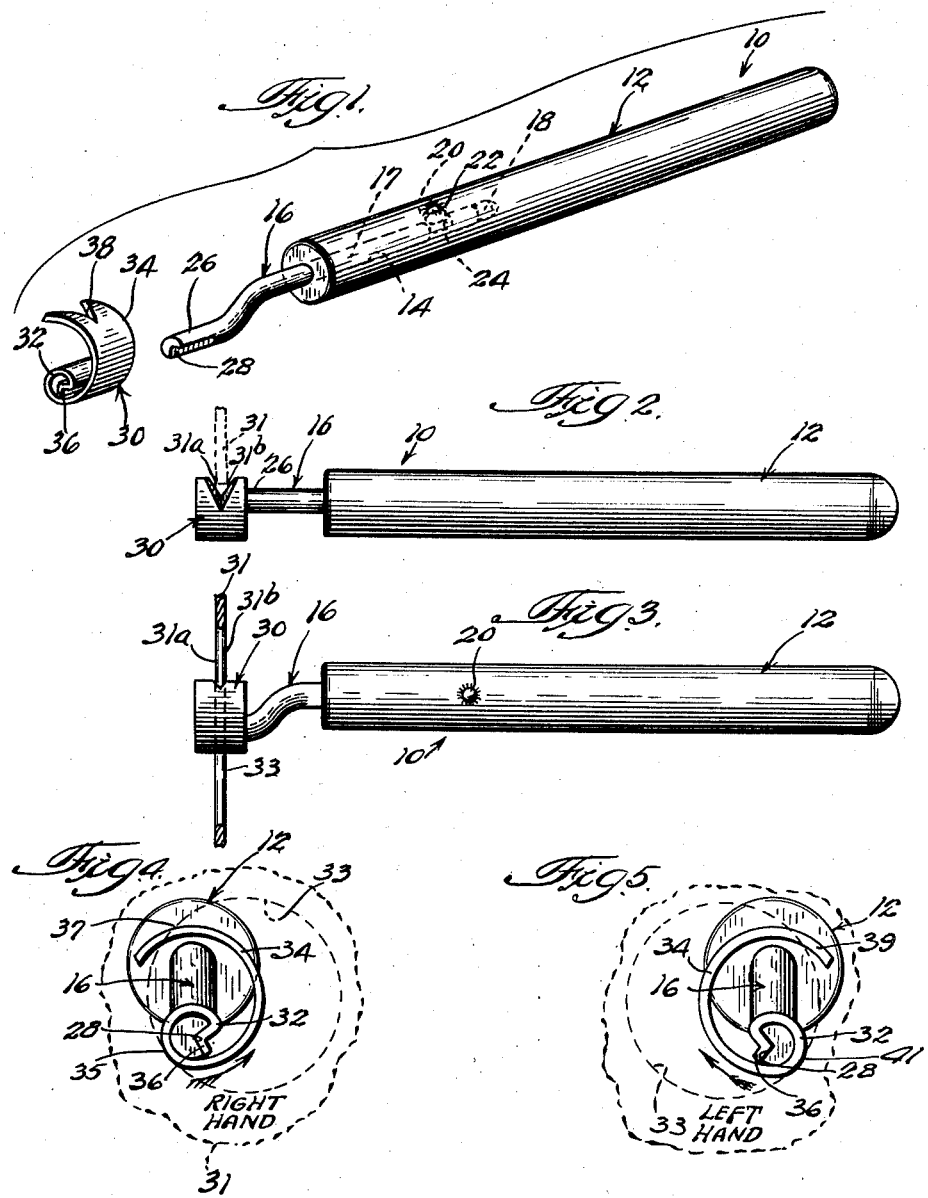
INVENTOR.
Richard E. Gilbert.
BY.

United States Patent Office 2,865,100
Patented Dec. 23, 1958

2,865,100

DEBURRING TOOL

Richard E. Gilbert, San Mateo, Calif., assignor to United Air Lines, Inc., Chicago, Ill., a corporation of Delaware Application February 8, 1956, Serial No. 564,290

4 Claims. (Cl. 30—317)

This invention relates to an improved deburring tool.

Cutting and other working operations performed by various tools on metal invariably result in the formation of rough metallic particles or burrs on the peripheral edges defining the area in which the specific metal-working operation has taken place. To insure subsequent safe and efficient use of the metal which has been worked, the rough metal particles or burrs must be removed. It is obvious that the means for removing the burrs should be easily manipulated, safe and durable in operation and preferably cheap in cost.

The tools heretofore employed in the art have been subject to many limitations. The most noteworthy shortcomings of deburring tools employed comprise the great care which the workman must exercise in the course of the deburring operation and the lack of tool flexibility.

It is an object of this invention to provide a deburring tool which is flexible in operation and thus able to deburr the peripheries of circular, elliptical or any irregularly shaped apertures, as well as other straight or irregularly shaped edges.

It is a further object of this invention to provide a deburring tool having cutting edges which bear on rough workpiece edges regardless of the configuration thereof.

It is a still further object of this invention to provide a deburring tool in which the part subject to wear, that is, the cutting head, may be replaced when desired, utilizing the remaining original tool structure indefinitely.

It is another object of this invention to provide a deburring tool which is readily adaptable for use by either right- or left-handed persons.

It is another object to provide a deburring tool which simultaneously removes burrs from the opposed lateral end limits or edges which define the thickness of a workpiece periphery.

It is a further object of this invention to provide a tool which will efficiently remove burrs or rough particles from peripheries of apertures of small diameter.

It is another object to provide a deburring tool which is composed of a minimum number of parts and which is durable, safe and low in cost.

The above and other objects will become more apparent from the following description, accompanying drawing and appended claims.

In one embodiment of the invention, a deburring tool which is adapted to remove rough metallic particles from edges of various configurations is provided and comprises a handle having an axial bore extending part way through the length thereof from one end. A crank member shaft portion is inserted in the bore and locked against longitudinal movement, although remaining freely rotatable in the handle. A cutting head, of spiral-like configuration, is secured in nonrotatable relationship to the free end portion of the crank member, which portion is offset from the crank shaft portion disposed in the handle. The spiral cutting head end limit has a V-shaped slot or notch, having opposed cutting edges, which are adapted to straddle edges which are to be deburred. The opposed cutting edges of the notch simultaneously bear down on the opposed lateral end limits or edges of the rough workpiece periphery because of the cutting head's tendency to rotate with the offset crank end portion to which it is attached, when the cutting head engages the rough edges to be deburred, as will hereinafter be explained in greater detail.

For a more complete understanding of this invention, reference should now be had to the drawings, wherein Figure 1 is a perspective view illustrating the various components, partly disassembled, of one form of deburring tool embodying the invention;

Fig. 2 is a side elevational view of the same tool in assembled condition;

Fig. 3 is a top plan view of the same assembly;

Fig. 4 is a fragmentary end elevational view of the deburring tool assembly as used by a right-handed workman; and Fig. 5 is a fragmentary end elevational view of the deburring tool assembly as used by a left-handed workman.

Referring now to the drawing and more particularly to Fig. 1, the various components comprising a deburring hand tool 10 are illustrated. An elongated handle 12 which is adapted to be manually gripped and comfortably held has an axial bore 14 formed therein. This bore is adapted to receive the shaft portion 17 of a crank member 16 which is readily insertable therein. A bearing ball 18 is positioned in the bottom of the bore 14 prior to insertion of shaft 17 of the crank member 16, whereby the latter member is enabled to rotate freely when in assembled relationship with the handle 12.

The locking mechanism which retains the crank 16 within the handle bore 14 but which allows rotational movement of the shaft within the handle comprises a bearing ball 20 which is inserted in a transverse bore 22 formed in the handle 12 and intersecting the axial bore 14 somewhat short of the inner extremity thereof. The end portion of the crank 16 disposed in the bore 14 is peripherally relieved whereby an annular recess 24 is formed. The length of the crank shaft portion 17 relative to the handle bore 14 is such that, when the ball 18 and the crank 16 are inserted therein, the shaft annular recess 24 will be oppositely disposed to the transverse bore 22 in the handle. The ball 20 is then inserted into the bore 22, and the periphery of the latter bore is then peened over to permanently lock the ball 20 in place with a portion thereof projecting into the bore 14 and the annular recess 24 of the crank. Following the above-described assembly operation, the crank shaft 16 is freely rotatable in the handle bore 14 but prevented from emerging therefrom because of the locking ball 20.

Formed integral with the crank 16 is an end portion 26 which is offset from and disposed parallel to the main shaft portion 17 disposed in the handle bore 14. A keyway 28 is formed in the crank portion 26 for purposes of engaging in immovable relationship a cutting head member 30. The cutting head 30 is preferably fabricated of spring steel and is of spiral-like configuration. The cutting head comprises an inner arcuate portion 32 and a larger arcuate or outwardly spiraling portion 34 which is formed integral with one end of the portion 32. The arcuate portion 32 terminates at its other end in an inwardly projecting wedge-shaped tongue 36 which is adapted to slidably engage the keyway 28 of crank portion 26. The keyway is tapered slightly so as to securely lock the cutting head to the crank portion 26 when assembled therewith.

As seen more clearly in Fig. 1, a V-shaped slot 38 is disposed in the outer end limit of the portion 34 of the cutting head 30. The opposed sides of the notch 38 are ground so as to define sharp cutting edges, but are so disposed as to be readily handled without danger of cutting the workman using the tool. In the normal course of a deburring operation, the opposed edges of notch 38 will straddle edges 31a and 31b of a workpiece 31 and efficiently and simultaneously remove all rough metallic particles or burrs attached thereto by merely drawing the cutting head 30 along the edges of the workpiece 31, or about the periphery of an aperture 33, in the manner depicted in Figs. 2 and 3, respectively.

Because of the free rotatability of the crank shaft 17 within the handle 12, and thus the free rotatability of the cutting head 30 about the handle, the cutting head 30 may be readily and smoothly guided over workpiece edges regardless of the edge configuration. The free rotatability of the cutting head about the handle enables the workman to use a continuous stroke in drawing the edges of the cutting head over rough workpiece edges whether the edges describe a straight line, a circle, an ellipse or other configuration.

It is apparent from Fig. 3 that the opposed cutting edges of the notch 38 disposed in the cutting head 30 efficiently bear down on all rough workpiece edges because of the tendency of the outer arcuate or spiral portion of the cutting head 30 to revolve about the offset portion 26 of the crank 16 when the latter offset portion is disposed over workpiece edges. Consequently, because of the novel cranklike configuration of the member 16, the cutting edges of the notch 38 in the cutting head 30 will always bear against the rough edges of a workpiece which is to be deburred by the mere placing of the cutting head 30 on the rough edges and the exertion of a slight downward pressure on the handle 12.

Because of the readily detachable nature of the cutting head 30, new heads may be readily substituted when the cutting edges of the notch 38 become dull or worn out. Consequently, the original handle and shaft may be used indefinitely, maintaining tool expense at a minimum.

A second advantage resulting from the ready removability of the cutting head 30 comprises the ready adaptability of the tool illustrated for use by either right- or left-handed persons. The wedge-shaped tongue 36 is so disposed relative to the notch 38 of the cutting head that, when the head 30 is reversed end-for-end from its right-handed mounting on the crank portion 26, the cutting notch will be properly disposed for cutting action when employed by a left-handed person.

Referring to Fig. 4, the deburring tool assembly for use by a right-handed workman is illustrated. The periphery of the workpiece aperture 33 is to be deburred and a right-handed workman would normally rotate the cutting head 30 in a clockwise direction as viewed from the handle end of the tool, which is indicated by the counterclockwise arrow in Fig. 4, inasmuch as this view is looking in the opposite direction. Upon the cutting head tangentially contacting the periphery of the aperture at 35, the cutting head notch rotates into engagement with the aperture periphery at 37 and the workman merely draws the tool about the periphery to effect the desired deburring operation, during which the cutting head is forced against the workpiece at the points 35 and 37. Thus the portion 32 of the cutting head is supported by the workpiece at the point 35 and the head is thereby guided and held in proper position relative to the workpiece during its operative action. The work-engaging pressure applied by the workman through the shaft 16 is effectively applied at the points 35 and 37 and preferably in major part at the point 37 where the cutting or deburring occurs. This is accomplished by locating the axis of the main shank portion of the shaft 16, which determines the effective point of pressure application, substantially closer to the point 37 than to the point 35, although it may be located at other points between those limits.

A left-handed workman would naturally tend to rotate the tool 10 in the opposite direction, as indicated by the clockwise arrow in Fig. 5. The cutting head in Fig. 4 is merely removed and inverted and the wedge tongue 36 once again slidably engages the keyway 28 formed in shaft portion 26. The cutting head portion 32 tangentially contacts the periphery 33 at 41 and the cutting head is thereby supported and guided while its notch edges engage the rough periphery at 39. Since the cutting edges again have a tendency to rotate into the periphery because of the offset nature of the shaft portion 26 to which the head is attached, the left-handed workman need merely rotate the tool in the normal direction as shown, transmitting desired pressure to the cutting edges through the handle 12.

It is also to be understood that, although the above has been described with reference only to metal workpieces the provided deburring instrument is equally well adapted to plastic and other compositions or materials which may be worked similarly to metal, resulting in rough edges containing projecting particles which are to be removed.

It is apparent, therefore, that a deburring tool has been disclosed which is highly efficient in operation and possessed of flexibility not found in tools of a similar nature. Despite the many advantages of efficiency and flexibility, the provided tool is composed of a minimum number of inexpensive parts and is inexpensive to maintain.

Changes may be made in the illustrated apparatus resulting in an instrument which still remains within the scope of the inventive concept provided. For instance, locking means other than the ball 20 may be utilized for retaining the crank member 16 to the handle 12. This invention is to be limited, therefore, only by the scope of the appended claims.

I claim:

1. A cutting tool comprising a shaft, said shaft having a main shank and an offset end portion disposed parallel thereto, a cutting head comprising a substantially spiral band having a substantially V-shaped notch disposed in the outer end portion thereof, said notch having opposed cutting edges, the inner end portion of said spiral band interlocking in nonrotatable relationship with said shaft offset end portion, said cutting head V-shaped notch being spaced from the axis of said main shank in a direction substantially opposite to that of the offsetting of said shaft offset portion from said axis.

2. A cutting tool as defined in claim 1 in which the distance of spacing of said notch from said main shank axis is less than the distance of offsetting of said shaft offset portion from said axis.

3. A cutting tool as defined in claim 1 in which said cutting head is detachably mounted on said shaft offset portion and is reversible end for end thereon whereby the cutting edges of said cutting head may be selectively located in either of two angular positions relative to the axis of said main shank.

4. A cutting tool as defined in claim 2 in which said cutting head is detachably mounted on said shaft offset portion and is reversible end for end thereon whereby the cutting edges of said cutting head may be selectively located in either of two angular positions relative to the axis of said main shank.

References Cited in the file of this patent

UNITED STATES PATENTS

| | | |
|---|---|---|
| 577,074 | Seitz | Feb. 16, 1897 |
| 1,491,311 | Pringle | Apr. 22, 1924 |
| 1,494,700 | Nussbaum | May 20, 1924 |
| 1,511,016 | Barker | Oct. 7, 1924 |
| 1,975,357 | Dunn | Oct. 2, 1934 |
| 2,240,410 | Murdock | Apr. 29, 1941 |
| 2,257,202 | Taylor | Sept. 30, 1941 |
| 2,378,459 | Beardsley | June 19, 1945 |
| 2,598,443 | Roth | May 27, 1952 |
| 2,646,621 | Catanese | July 28, 1953 |